US012305814B2

(12) United States Patent
Gumann et al.

(10) Patent No.: US 12,305,814 B2
(45) Date of Patent: May 20, 2025

(54) CUSTOM THERMAL SHIELDS FOR CRYOGENIC ENVIRONMENTS

(71) Applicant: International Business Machines Corporation, Armonk, NY (US)

(72) Inventors: Patryk Gumann, Tarrytown, NY (US); Valerio A. Grendanin, St. Augustine, FL (US); Sean Hart, Tarrytown, NY (US); David C. Mckay, Ossining, NY (US); Jerry M. Chow, Scarsdale, NY (US); David Zarsky, Bethlehem, PA (US); Gilbert Bauer, Peekskill, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 286 days.

(21) Appl. No.: 17/144,932

(22) Filed: Jan. 8, 2021

(65) Prior Publication Data

US 2022/0221107 A1 Jul. 14, 2022

(51) Int. Cl.
*F17C 3/08* (2006.01)
*F25D 19/00* (2006.01)
*H01F 6/04* (2006.01)

(52) U.S. Cl.
CPC ............ *F17C 3/085* (2013.01); *F25D 19/006* (2013.01); *F17C 2201/0119* (2013.01);
(Continued)

(58) Field of Classification Search
CPC .............. F17C 3/085; F17C 2201/0119; F17C 2203/0391; F17C 2203/0646; F25D 19/006; F25D 19/00; F25B 9/10
(Continued)

(56) References Cited

U.S. PATENT DOCUMENTS 4,300,356 A * 11/1981 Notaro ...................... F17C 3/02
62/48.1
8,307,665 B2 * 11/2012 Nagamune ............ F25D 19/006
62/51.1
(Continued)

FOREIGN PATENT DOCUMENTS

GB 2495098 A * 4/2013 ............ F17C 13/001
GB 2533170 A * 6/2016 ............ F17C 13/006
(Continued)

OTHER PUBLICATIONS

International Search Report and Written Opinion received for PCT Application Serial No. PCT/EP2021/087874 dated May 3, 2022, 14 pages.

(Continued)

*Primary Examiner* — John F Pettitt, III
*Assistant Examiner* — Ibrahim A. Michael Adeniji
(74) *Attorney, Agent, or Firm* — Amin, Turocy & Watson, LLP

(57) ABSTRACT

Techniques facilitating custom thermal shields for cryogenic environments are provided. In one example, a cryostat can comprise a thermal shield extending between a thermal stage and a base structure coupled to a bottom plate of an outer vacuum chamber. The thermal stage can be coupled to a top plate of the outer vacuum chamber. The thermal shield can provide access to a sample mounting surface encompassed within the thermal shield from a region external to the outer vacuum chamber via the top and bottom plates of the outer vacuum chamber.

24 Claims, 9 Drawing Sheets

(52) U.S. Cl.
CPC ................. *F17C 2203/0391* (2013.01); *F17C 2203/0646* (2013.01); *F17C 2270/0527* (2013.01); *H01F 6/04* (2013.01)

(58) Field of Classification Search
USPC ........................................ 505/888, 894; 62/6
See application file for complete search history.

(56) References Cited

U.S. PATENT DOCUMENTS

| | | | | |
|---|---|---|---|---|
| 8,464,542 | B2 * | 6/2013 | Hilton | F25B 9/10 62/46.1 |
| 8,516,834 | B2 | 8/2013 | Snow et al. | |
| 11,802,663 | B2 * | 10/2023 | Corcoles-Gonzalez | F17C 3/085 |
| 11,971,141 | B2 * | 4/2024 | Gumann | F25D 19/006 |
| 12,020,115 | B2 * | 6/2024 | Bogorin | F25B 9/12 |
| 12,117,130 | B2 * | 10/2024 | Chow | F17C 3/085 |
| 2008/0115510 | A1 * | 5/2008 | Crowley | F25D 19/00 174/15.1 |
| 2010/0050661 | A1 * | 3/2010 | Snow | F25B 9/14 62/51.1 |
| 2011/0009274 | A1 * | 1/2011 | Uchaykin | H05K 9/0077 505/150 |
| 2014/0007596 | A1 * | 1/2014 | Prester | F25B 9/14 62/51.1 |
| 2014/0202179 | A1 * | 7/2014 | Batey | F25B 9/12 62/190 |
| 2020/0272927 | A1 * | 8/2020 | Bronn | H01P 3/06 |
| 2020/0363014 | A1 | 11/2020 | Hart et al. | |
| 2020/0370792 | A1 * | 11/2020 | Matthews | F25B 9/12 |

FOREIGN PATENT DOCUMENTS

| | | | | |
|---|---|---|---|---|
| JP | 2011-060864 | A | 3/2011 | |
| WO | WO-2005080858 | A1 * | 9/2005 | F17C 3/08 |
| WO | WO-2012127255 | A3 * | 11/2012 | F17C 13/00 |

OTHER PUBLICATIONS

Response to the communication pursuant to R 161 (1) and R 162 EPC received for European Patent Application Serial No. 21845078.1 dated Feb. 16, 2024, 5 pages.

"Response to Examiner's Report" Australian Patent Application No. 2021417883, Jan. 6, 2025, 2 pages.

Australian Government, "Notice of Acceptance for Patent Application", Australian Application No.: 2021417883, Dated Jan. 21, 2025, 3 Pages.

* cited by examiner

CUSTOM THERMAL SHIELDS FOR CRYOGENIC ENVIRONMENTS

BACKGROUND

The subject disclosure relates to cryogenic environments, and more specifically, to techniques of facilitating custom thermal shields for cryogenic environments.

A cryostat can maintain samples or devices positioned on a sample mounting surface located within the cryostat at temperatures approaching absolute zero to facilitate evaluating such samples or devices under cryogenic conditions. Cryostats generally provide such low temperatures utilizing multiple thermal stages that comprise a thermal profile in which each subsequent thermal stage has a progressively lower temperature than exists at a preceding thermal stage. Maintaining the samples or devices within the cryostat under cryogenic conditions can involve thermally isolating the sample mounting surface from ambient environment proximate to the cryostat.

Such thermal isolation is generally provided by an outer vacuum chamber of the cryostat that can maintain the multiple thermal stages under vacuum conditions. Some cryostats employ an outer vacuum chamber having a top plate and a vacuum can. The top plate mechanically couples to thermal stages of a cryostat and the vacuum can couples with the top plate via a sealing mechanism to enclose the thermal stages within the outer vacuum chamber. Operation of a pump can reduce a pressure within the outer vacuum chamber to maintain the thermal stages under vacuum conditions.

One or more thermal shields disposed within an outer vacuum chamber of a cryostat can provide additional thermal isolation for thermal stages of a cryostat. A thermal shield can generally provide such thermal isolation by obstructing electromagnetic waves (e.g., blackbody radiation) generated by a heat source external to the thermal shield. By obstructing such electromagnetic waves, the thermal shield can mitigate thermal radiation from the heat source to lower temperature regions of the cryostat within the thermal shield.

While a thermal shield can be effective in providing thermal isolation for cryostats, the thermal shield can negatively impact scalability of cryostats. For example, some cryostats employ thermal shields implemented as a cylinder having an open end and a closed end that opposes the open end. In some instances, cryostats can employ such thermal shields due to vertical clearance requirements associated with top-loading or bottom-loading sample exchange mechanisms. The closed end of such thermal shields can represent an obstruction for routing input/output lines to the sample mounting surface from a region external to the outer vacuum chamber.

SUMMARY

The following presents a summary to provide a basic understanding of one or more embodiments of the invention. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, systems, devices, and/or methods that facilitate custom thermal shields for cryogenic environments are described.

According to an embodiment, a cryostat can comprise a thermal shield extending between a thermal stage and a base structure coupled to a bottom plate of an outer vacuum chamber. The thermal stage can be coupled to a top plate of the outer vacuum chamber. The thermal shield can provide access to a sample mounting surface encompassed within the thermal shield from a region external to the outer vacuum chamber via the top and bottom plates of the outer vacuum chamber. One aspect of such a cryostat is that the cryostat can facilitate custom thermal shields for cryogenic environments.

In an embodiment, the thermal shield is partitioned into a plurality of sections extending between the thermal stage and the base structure. One aspect of such a cryostat is that the cryostat can facilitate modularity in implementing a thermal shield.

According to another embodiment, a cryostat can comprise a flexible structure intervening between a thermal shield and a bottom structure coupled to a bottom plate of an outer vacuum chamber. The flexible structure can mechanically couple the thermal shield to the bottom structure. The thermal shield can extend between the bottom structure and a thermal stage coupled to a top plate of the outer vacuum chamber. The thermal shield can provide access to a sample mounting surface encompassed within the thermal shield from a region external to the outer vacuum chamber via the top and bottom plates of the outer vacuum chamber. One aspect of such a cryostat is that the cryostat can facilitate custom thermal shields for cryogenic environments.

In an embodiment, the flexible structure can facilitate vertical movement of the thermal shield with respect to the base structure. One aspect of such a cryostat is that the cryostat can facilitate preserving a structural integrity of the thermal shield as the geometries of the thermal stage vary due to thermal expansion/contraction.

According to another embodiment, a cryostat can comprise a base structure coupled to a bottom plate of an outer vacuum chamber and a flexible structure intervening between the base structure and a thermal shield. The flexible structure can mechanically couple the base structure to the thermal shield. The thermal shield can extend between the base structure and a thermal stage coupled to a top plate of the outer vacuum chamber. The thermal shield can provide access to a sample mounting surface encompassed within the thermal shield from a region external to the outer vacuum chamber via the top and bottom plates of the outer vacuum chamber. One aspect of such a cryostat is that the cryostat can facilitate custom thermal shields for cryogenic environments.

In an embodiment, the flexible structure can thermally couple the base structure with the thermal stage. One aspect of such a cryostat is that the cryostat can facilitate minimizing a thermal gradient within the thermal shield.

DETAILED DESCRIPTION

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

Figure 1:
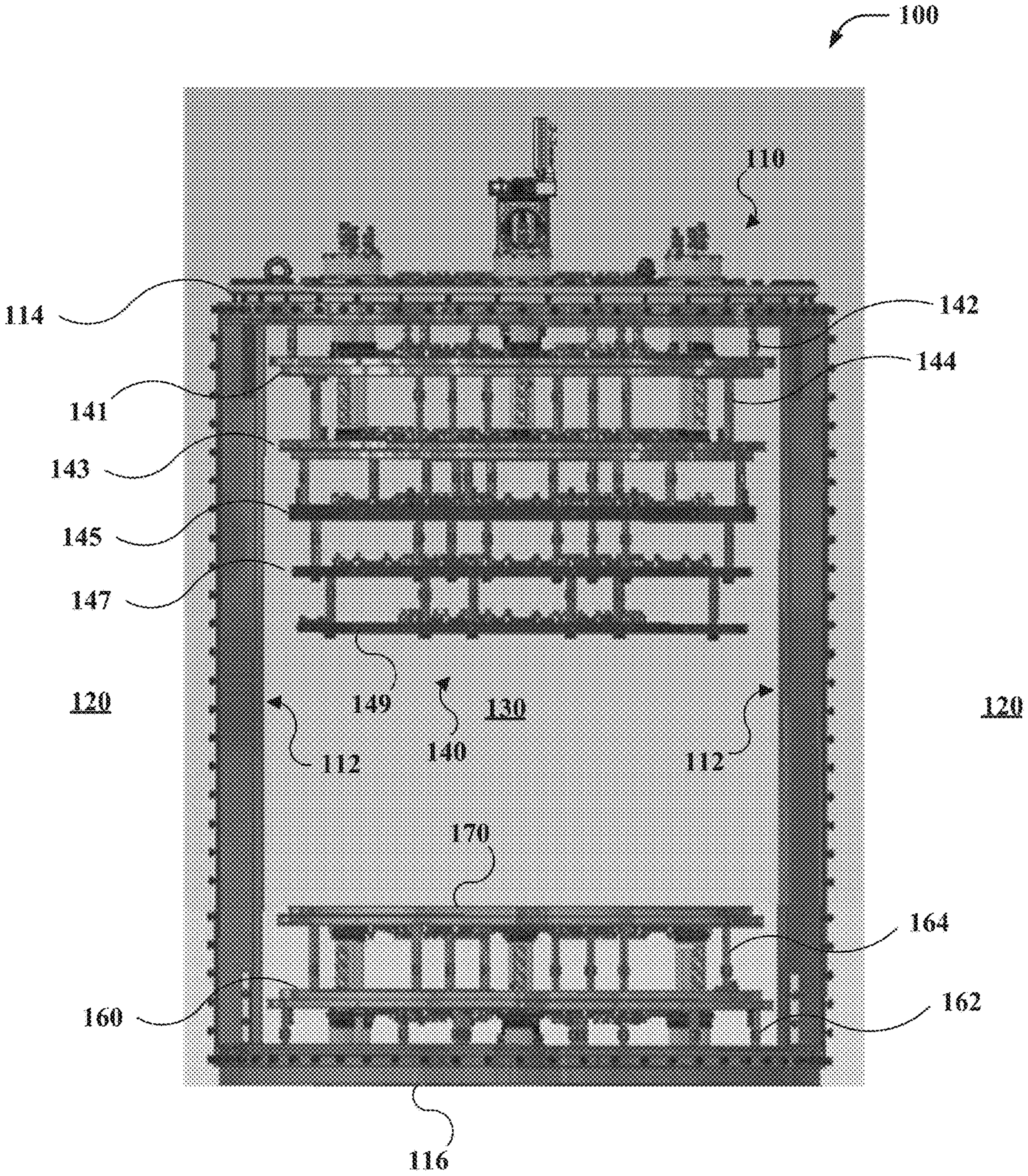
FIG. 1 illustrates an example, non-limiting cryostat, in accordance with one or more embodiments described herein.

FIG. 1 illustrates an example, non-limiting cryostat 100, in accordance with one or more embodiments described herein. As shown in FIG. 1, cryostat 100 comprises an outer vacuum chamber 110 formed by a sidewall 112 intervening between a top plate 114 and a bottom plate 116. In operation, outer vacuum chamber 110 can maintain a pressure differential between an ambient environment 120 of outer vacuum chamber 110 and an interior 130 of outer vacuum chamber 110. Cryostat 100 can further comprise a plurality of thermal stages (or stages) 140 disposed within interior 130 that are each mechanically coupled to top plate 114. The plurality of stages 140 includes: stage 141, stage 143, stage 145, stage 147, and stage 149.

Each stage among the plurality of stages 140 can be associated with a different temperature. For example, stage 141 can be a 50-kelvin (50-K) stage that is associated with a temperature of 50 kelvin (K), stage 143 can be a 4-kelvin (4-K) stage that is associated with a temperature of 4 K, stage 145 can be associated with a temperature of 700 millikelvin (mK), stage 147 can be associated with a temperature of 100 mK, and stage 149 can be associated with a temperature of 10 mK. In an embodiment, stage 145 can be a Still stage, stage 147 can be a Cold Plate stage, and stage 149 can be a Mixing Chamber stage. One or more support rods (e.g., support rod 142) can couple the plurality of stages 140 to top plate 114 of outer vacuum chamber 110. Moreover, each stage among the plurality of stages 140 can be spatially isolated from other stages of the plurality of stages 140 by a plurality of support rods (e.g., support rod 144). In an embodiment, support rods 142 and/or 144 can comprise stainless steel.

As shown by FIG. 1, cryostat 100 can further comprise one or more base structures coupled to bottom plate 116 of outer vacuum chamber 110. For example, cryostat 100 can further comprise a base structure 160 that can facilitate mechanically supporting a thermal shield associated with stage 141. In an embodiment, base structure 160 and stage 141 can operate at substantially similar temperatures (e.g., 50 K). As another example, cryostat 100 can further comprise a base structure 170 that can facilitate mechanically supporting a thermal shield associated with stage 143. In an embodiment, base structure 170 and stage 143 can operate at substantially similar temperatures (e.g., 4 K). One or more support rods (e.g., support rod 162) can couple base structures 160 and/or 170 to bottom plate 116 of outer vacuum chamber 110. Moreover, plates 160 and 170 can be spatially isolated by a plurality of support rods (e.g., support rod 164).

Figure 2:
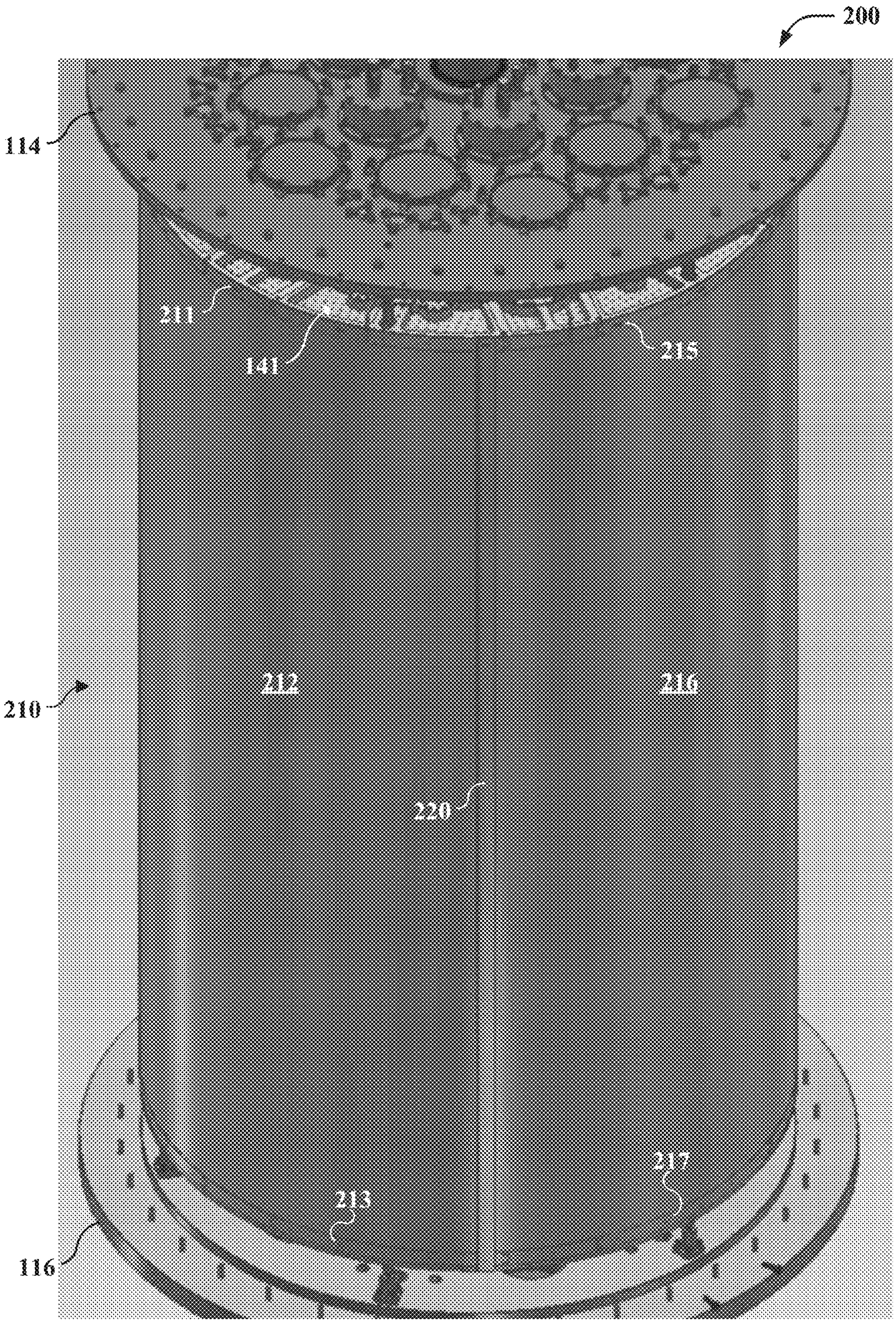
FIG. 2 illustrates an example, non-limiting external isometric view depicting a thermal shield of the cryostat of FIG. 1, in accordance with one or more embodiments described herein.
Figure 3:
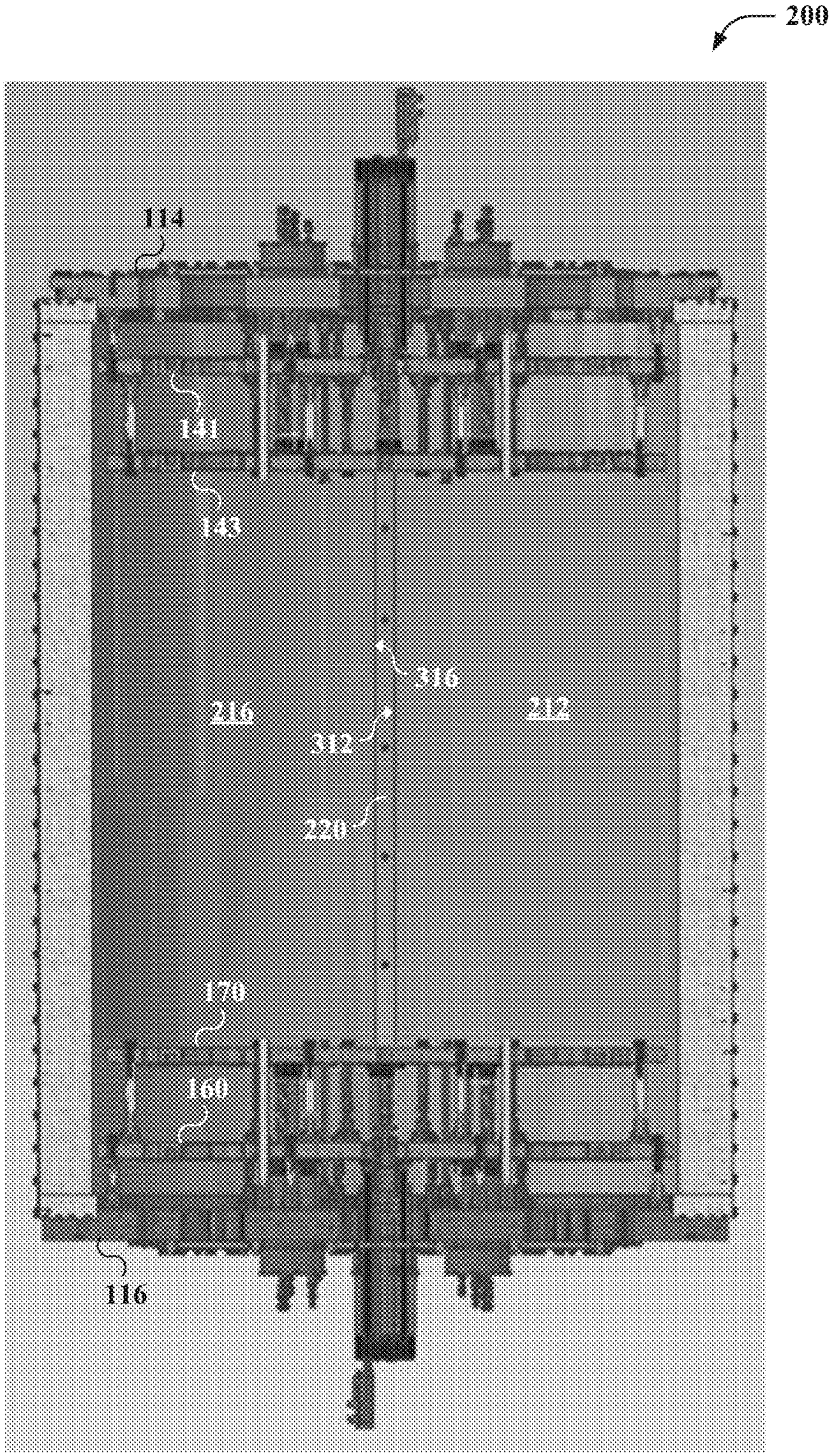
FIG. 3 illustrates an example, non-limiting internal side view depicting the thermal shield of FIG. 2, in accordance with one or more embodiments described herein.

FIGS. 2-3 illustrate example, non-limiting views of a thermal shield 210 of cryostat 100, in accordance with one or more embodiments described herein. In particular, FIGS. 2-3 illustrate an external isometric view 200 and an internal side view 300 of thermal shield 210, respectively. As shown by FIGS. 2-3, a thermal shield 210 can be partitioned into multiple sections (e.g., sections 212 and 216) that each extend between a thermal stage (e.g., stage 141) and a base structure (e.g., base structure 160). Sections 212 and 216 of thermal shield 210 can comprise a plurality of clearance holes (e.g., clearance holes 211 and 215) for receiving attachment mechanisms (e.g., bolts and/or screws) that facilitate coupling thermal shield 210 to stage 141. Sections 212 and 216 of thermal shield 210 can further comprise a plurality of clearance holes (e.g., clearance holes 213 and 217) for receiving attachment mechanisms (e.g., bolts and/or screws) that facilitate coupling thermal shield 210 to base structure 160. As discussed in greater detail below, a flexible structure (e.g., flexible structure 630 of FIGS. 6-9) intervening between thermal shield 210 and base structure 160 can mechanically and thermally couple thermal shield 210 and base structure 160 to facilitate movement of thermal shield 210 with respect to base structure 160.

Thermal shield 210 can comprise a metal strip 220 extending between stage 141 and base structure 160. Metal strip 220 can overlay a seam or gap intervening between adjacent sections of thermal shield 210. For example, a side edge 312 of section 212 and a side edge 316 of section 216 can define a seam or gap between sections 212 and 216. In this example, the seam or gap between sections 212 and 216 can arise due to machining tolerances associated with manufacturing sections 212 and 216. As shown by FIGS. 2-3, metal strip 220 can overlay the seam or gap intervening between sections 212 and 216 of thermal shield 210 to minimize radiation of energy from heat sources external to thermal shield 210 to lower temperature thermal stages of cryostat 100. In an embodiment, thermal shield 210 can comprise a minimum thickness (e.g., an eighth of an inch). In an embodiment, the minimum thickness of thermal shield 210 can be defined by a pressure level within outer vacuum chamber 110 while cryostat 100 is operational.

Figure 4:
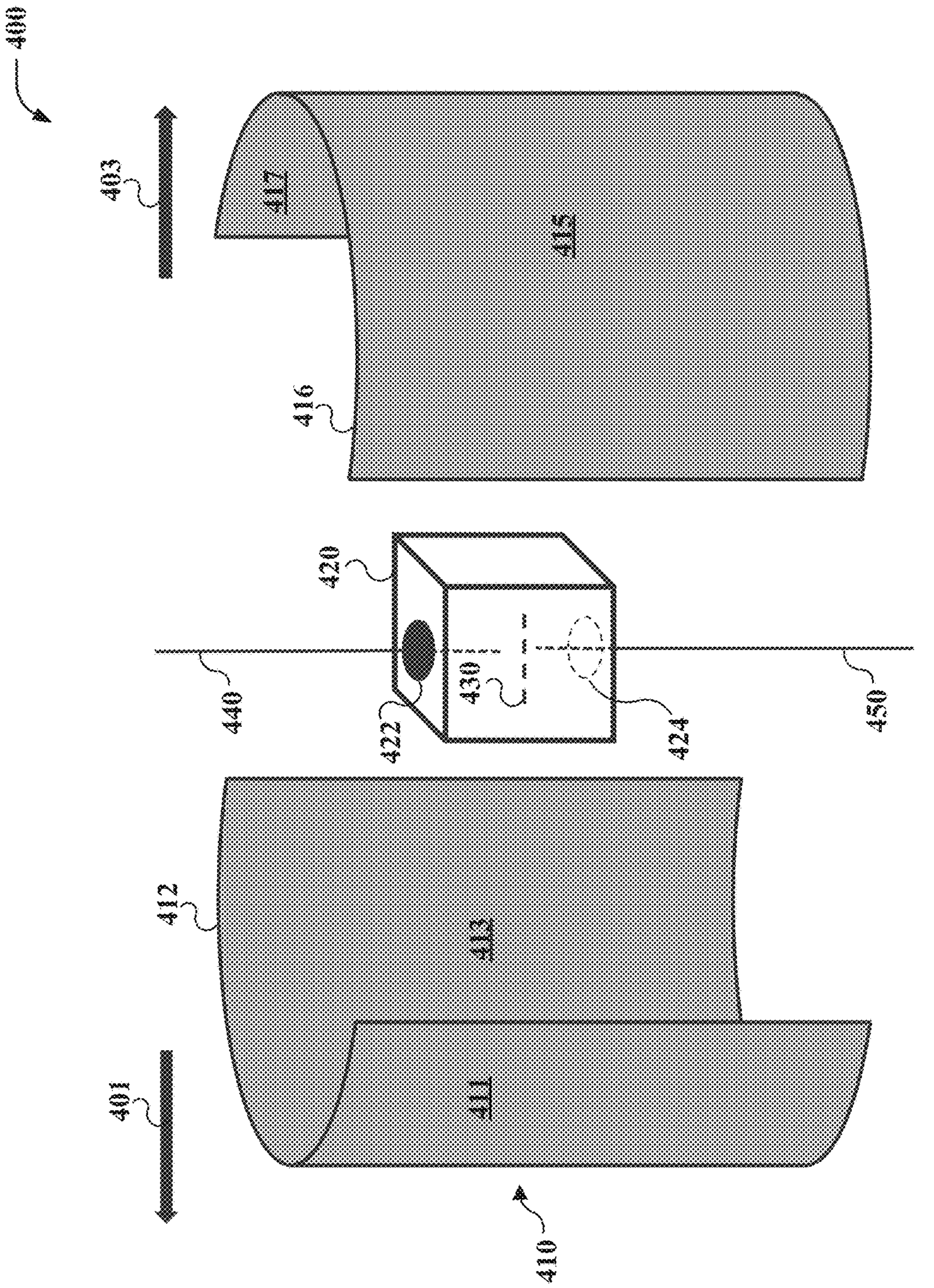
FIG. 4 illustrates an example, non-limiting thermal shield, in accordance with one or more embodiments described herein.
Figure 5:
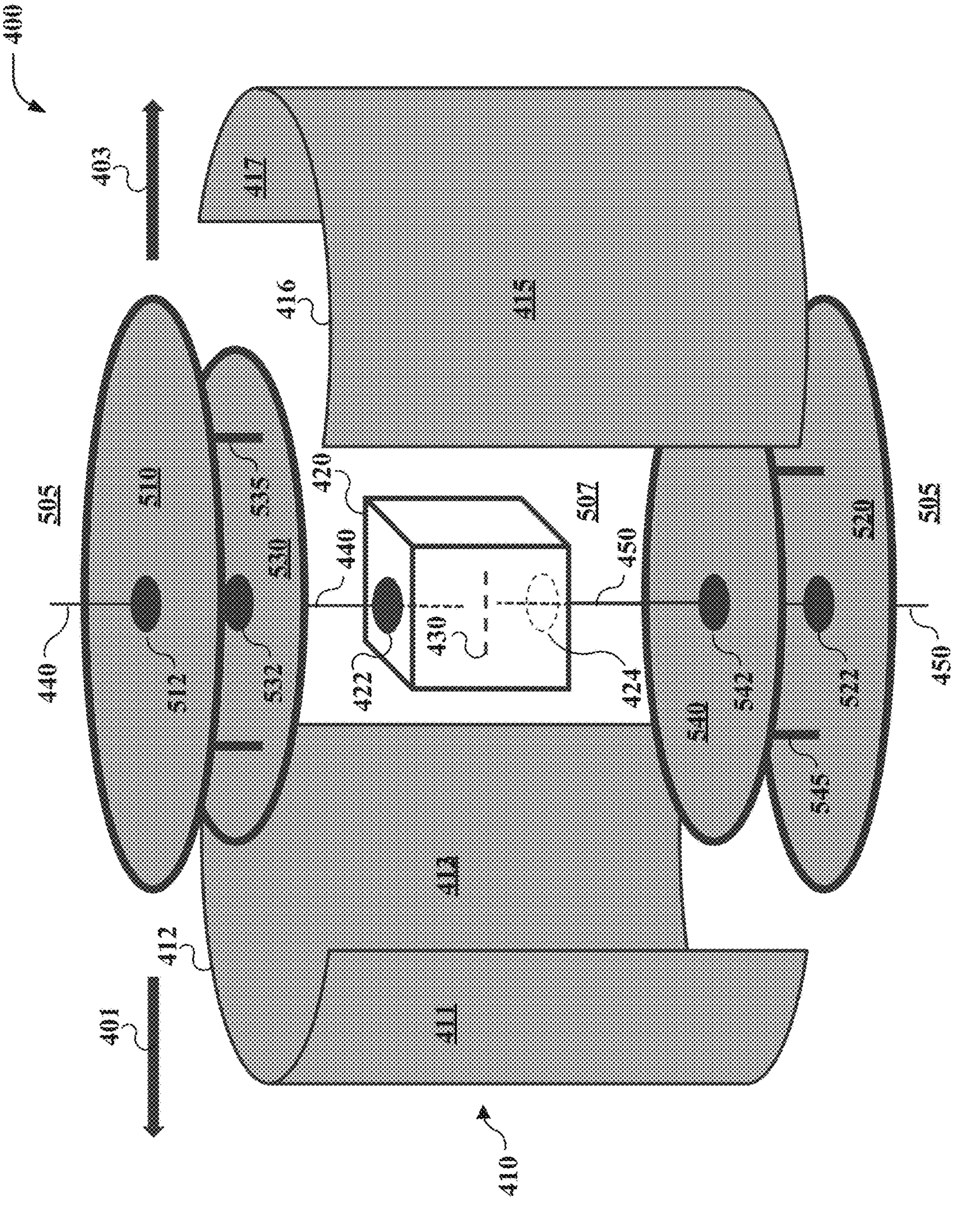
FIG. 5 illustrates the example, non-limiting thermal shield of FIG. 4 extending between a thermal stage and a base structure, in accordance with one or more embodiments described herein.
Figure 6:
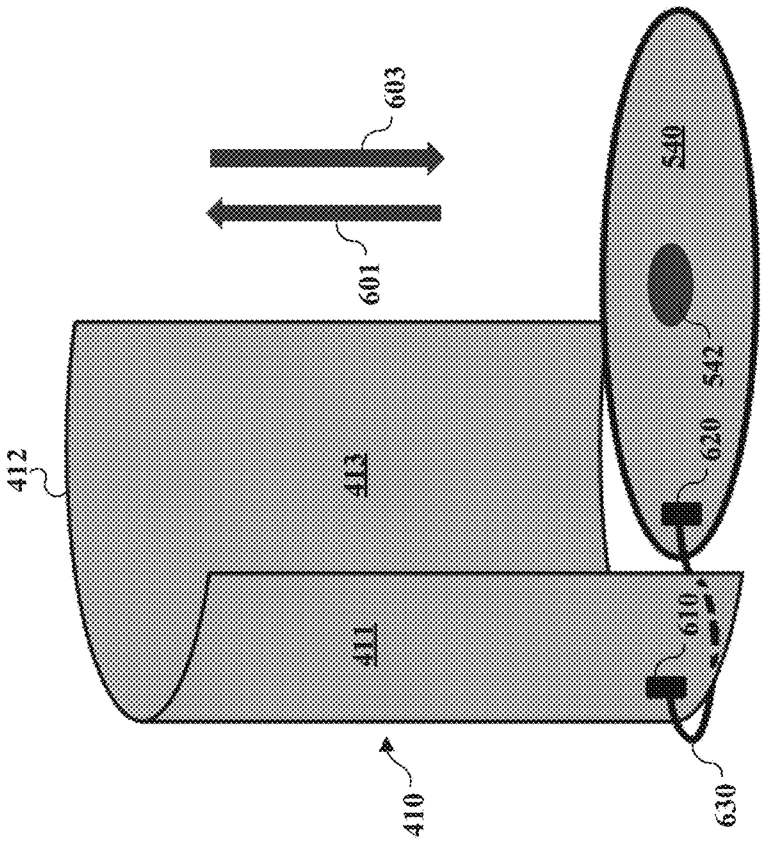
FIG. 6 illustrates the example, non-limiting thermal shield of FIG. 4 mechanically coupled to the base structure by a flexible structure intervening between the thermal shield and the base structure, in accordance with one or more embodiments described herein.

FIGS. 4-6 illustrate an example, non-limiting cryostat 400 with a thermal shield 410, in accordance with one or more embodiments described herein. With reference to FIG. 4, thermal shield 410 can encompass a sample mounting surface 430 positioned within an inner chamber 420 of cryostat 400. Sample mounting surface 430 can be associated with the lowest temperature thermal stage of cryostat 400. For example, sample mounting surface 430 can be thermally coupled to a Mixing Chamber stage of cryostat 400. Thermal shield 400 generally obstructs electromagnetic waves (e.g., blackbody radiation) generated by a heat source (e.g., higher temperature thermal stage of cryostat 400) to mitigate thermal radiation from the heat source to lower temperature thermal stages (e.g., sample mounting surface 430) of cryostat 400. In an embodiment, thermal shield 410 can comprise aluminum, copper, brass, titanium, gold, platinum, or a combination thereof.

With reference to FIG. 5, cryostat 400 can comprise a top plate 510 and a bottom plate 520 of an outer vacuum chamber that can maintain a pressure differential between an exterior region 505 of the outer vacuum chamber and an interior region 507 of the outer vacuum chamber. Cryostat 400 can further comprise a thermal stage 530 and a base structure 540 that are coupled to top plate 510 and bottom plate 520, respectively. Thermal stage 530 and base structure 540 can be mechanically coupled to and spatially isolated from top plate 510 and bottom plate 520, respectively, by a plurality of support rods (e.g., support rods 535 and 545).

In various embodiments, thermal shield 410 can be partitioned into multiple sections to facilitate modularity in implementing thermal shield 410. By way of example, FIGS. 4-5 illustrate thermal shield 410 being partition into two sections—sections 412 and 416. As illustrated by FIG. 5, sections 412 and 416 each extend between thermal stage 530 and base structure 540 of cryostat 400. In an embodiment, sections 412 and 416 can be removably coupled such that section 412 can be removed from cryostat 400 in a direction 401 and section 416 can be removed from cryostat 400 in a direction 403 that opposes direction 401. In an embodiment, sections 412 and 416 can be removably coupled such that section 412 can be removed from cryostat 400 in a direction 401 and section 416 can be removed from cryostat 400 in a direction 403 that opposes direction 401.

In an embodiment, the multiple sections of thermal shield 410 can include a stationary section and a removeable section. In this embodiment, the stationary section can be permanently or semi-permanently coupled (e.g., welded) to a frame structure associated with the outer vacuum chamber comprising top and bottom plates 510 and 520. Permanently or semi-permanently coupling the stationary section to the frame structure can extend a time for removal of the stationary section from cryostat 400. In this embodiment, the removeable section can be impermanently coupled (e.g., via attachment mechanisms, such as bolts and/or screws) to the frame structure. Impermanently coupling the removeable section to the frame structure can reduce a time for removal of the removeable section from cryostat 400 to facilitate quick access to components encompassed within thermal shield 410.

As shown by FIGS. 4-5, thermal shield 410 can provide access to sample mounting surface 430 from exterior region 505 of the outer vacuum chamber via top plate 510 and bottom plate 540 of the outer vacuum chamber. One aspect of providing such access to sample mounting surface 430 can involve thermal shield 410 being arranged to provide minimal obstructions between sample mounting surface 430 and the top and bottom plates 510 and 520 of the outer vacuum chamber. For example, inner chamber 420 can comprise a feedthrough port 422 intervening between sample mounting surface 430 and top plate 510. Inner chamber 420 can further comprise a feedthrough port 424 intervening between sample mounting surface 430 and bottom plate 520. Feedthrough ports 422 and 424 can facilitate providing lines 440 and 450 of an input/output line pair with access to sample mounting surface 430 from exterior region 505.

In this example, top plate 510 and thermal stage 530 can intervene between feedthrough port 422 and exterior region 505. As such, top plate 510 and thermal stage 530 can represent obstructions for routing line 440 between exterior region 505 and sample mounting surface 430. To mitigate such obstructions, top plate 510 and thermal stage 530 can include feedthrough ports 512 and 532, respectively, that align with feedthrough port 422. In contrast, the routing of line 440 between exterior region 505 and sample mounting surface 430 is unobstructed by thermal shield 410. Therefore, thermal shield 410 lacks feedthrough ports for routing line 440 between exterior region 505 and sample mounting surface 430.

Similarly, bottom plate 520 and base structure 540 intervene between feedthrough port 424 and exterior region 505 in this example. As such, bottom plate 520 and base structure 540 can represent obstructions for routing line 450 between exterior region 505 and sample mounting surface 430. To mitigate such obstructions, bottom plate 520 and base structure 540 can include feedthrough ports 522 and 542, respectively, that align with feedthrough port 424. In contrast, the routing of line 450 between exterior region 505 and sample mounting surface 430 is again unobstructed by thermal shield 410. Therefore, thermal shield 410 lacks feedthrough ports for routing line 450 between exterior region 505 and sample mounting surface 430. By providing unobstructed routing for input/output lines between exterior region 505 and sample mounting surface 430 via both top plate 510 and bottom plate 520, thermal shield 410 can facilitate accommodating an increased number of input/output lines.

Thermal shield 410 can extend between thermal stage 530 and base structure 540. In an embodiment, thermal stage 530 can be a 50-K stage, a 4-K stage, a Still stage, a Cold Plate state, or a Mixing Chamber stage. In an embodiment, thermal stage 530 and base structure 540 can operate at substantially similar temperatures. For example, if thermal stage 530 is a 4-K stage, base structure 540 can operate at a temperature of approximately 4 K. As thermal shield 410 extends between thermal stage 530 and base structure 540, a thermal gradient can develop within thermal shield 410. To facilitate minimizing such thermal gradients, thermal shield 410 can be thermally coupled with thermal stage 530 and base structure 540.

Mechanically coupling thermal shield 410 with thermal stage 530 and base structure 540 can facilitate thermally coupling thermal shield 410 with thermal stage 530 and base structure 540. However, one skilled in the art will recognize that geometries of thermal stage 530 and base structure 540 can vary as respective temperatures of thermal stage 530 and base structure 540 change due to thermal expansion/contraction. Moreover, the respective geometries of thermal stage 530 and base structure 540 can vary at different rates, directions, and/or magnitudes. Therefore, mechanically coupling thermal shield 410 with thermal stage 530 and base structure 540 in a rigid manner can negatively impact a structural integrity of thermal shield 410. Accordingly, providing some flexibility in the mechanical coupling of thermal shield 410 with thermal stage 530 and base structure 540 can facilitate preserving a structure integrity of thermal shield 410.

Figure 7:
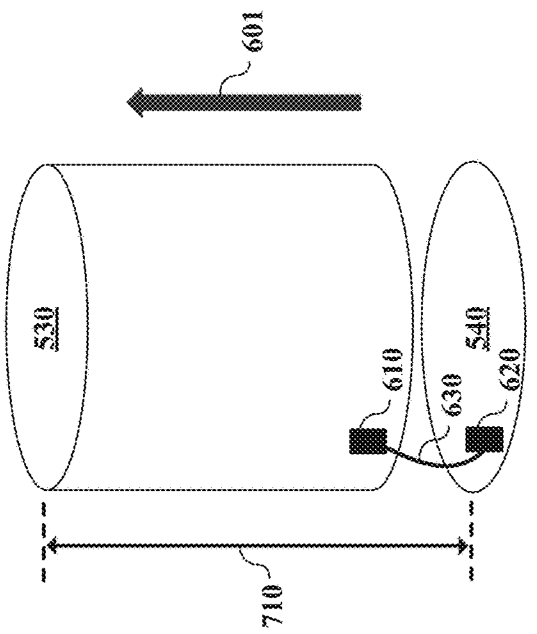
FIG. 7 illustrates the flexible structure facilitating vertical movement of the example, non-limiting thermal shield of FIG. 4 with respect to the base structure in a first direction, in accordance with one or more embodiments described herein.
Figure 8:
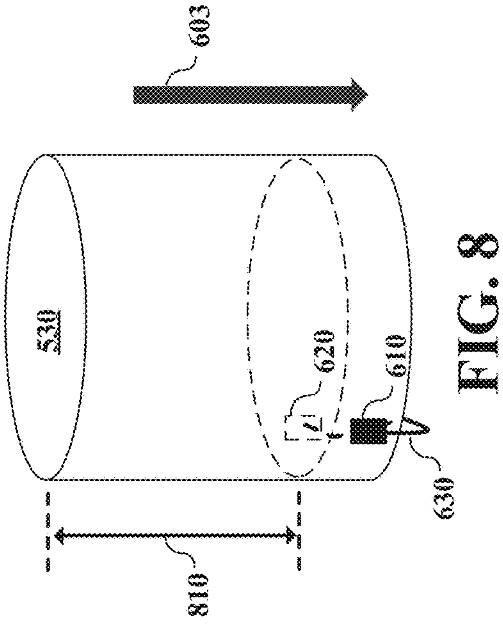
FIG. 8 illustrates the flexible structure facilitating vertical movement of the example, non-limiting thermal shield of FIG. 4 with respect to the base structure in a second direction that opposes the first direction of FIG. 7, in accordance with one or more embodiments described herein.

As shown by FIGS. 6-8, a flexible structure 630 intervening between thermal shield 410 and base structure 540 can provide such flexibility by concurrently mechanically coupling and thermally coupling thermal shield 410 to base structure 540. In an embodiment, flexible structure 630 can comprise aluminum, copper, brass, titanium, gold, platinum, or a combination thereof. In an embodiment, flexible structure 630 can comprise a foil or a braided wire. Flexible structure 630 can couple with an attachment point 620 of base structure 540 on an interior side 413 of section 412 of thermal shield 410. Flexible structure 630 can also couple with thermal shield 410 at an attachment point 610 (e.g., clearance holes 1430 and/or 1930 of FIGS. 14 and 19, respectively) of section 412 on an exterior side 411 that opposes interior side 413.

FIGS. 7-8 illustrate that flexible structure 630 can facilitate movement of thermal shield 410 with respect to base structure 540. For example, thermal shield 410 can be mechanically anchored to thermal stage 530 via a plurality of attachment mechanisms (e.g., bolts and/or screws) passing through respective clearances holes (e.g., clearance holes 1410 and 1910 of FIGS. 14 and 19, respectively) of thermal shield 410. In this example, geometries of thermal stage 530 can vary due to thermal expansion/contraction that imparts vertical movement on thermal shield 410 in an upward direction 601 and/or a downward direction 603 that opposes the upward direction 601.

By operation of flexible structure 630 such vertical movement imparted on thermal shield 410 can translate into vertical displacement between thermal stage 530 and base structure 540 instead of negatively impacting a structural integrity of thermal shield 410. As shown by FIG. 7, the vertical movement imparted on thermal shield 410 in upward direction 601 can increase vertical displacement 710 between thermal stage 530 and base structure 540. As shown by FIG. 8, the vertical movement imparted on thermal shield 410 in downward direction 601 can decrease vertical displacement 810 between thermal stage 530 and base structure 540.

Flexible structure 630 can comprise slack or excess to accommodate for such increased and/or decreased vertical displacement between thermal stage 530 and base structure 540. In an embodiment, the slack or excess of flexible structure 630 can be defined by a maximum vertical displacement of thermal shield 410 responsive to varying geometries of thermal stage 530 due to thermal expansion or contraction. In an embodiment, the maximum vertical displacement of thermal shield 410 can be determined using a maximum increase in vertical displacement (e.g., increase vertical displacement 710) between thermal stage 530 and base structure 540. In an embodiment, the maximum vertical displacement of thermal shield 410 can be determined using a maximum decrease in vertical displacement (e.g., decrease vertical displacement 810) between thermal stage 530 and base structure 540.

Figures 9, 10, 11, 12, 13:
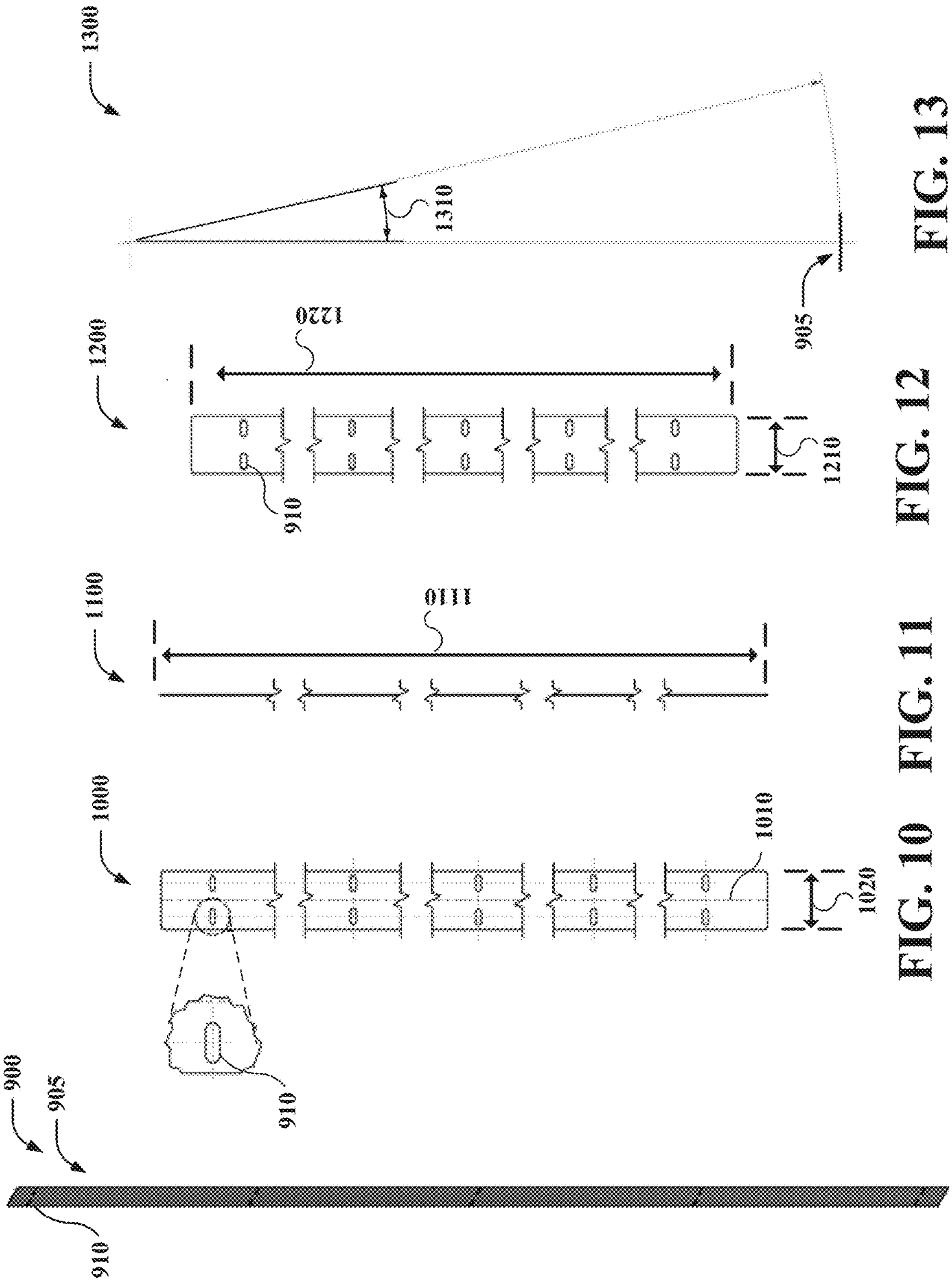
FIG. 9 illustrates an example, non-limiting isometric view depicting a metal strip that overlays a seam intervening between adjacent sections of a thermal shield, in accordance with one or more embodiments described herein.
FIG. 10 illustrates an example, non-limiting orthogonal view depicting the metal strip of FIG. 9 in a flat state, in accordance with one or more embodiments described herein.
FIG. 11 illustrates an example, non-limiting side view of the metal strip of FIG. 9 in the flat state, in accordance with one or more embodiments described herein.
FIG. 12 illustrates an example, non-limiting orthogonal view depicting the metal strip of FIG. 9 in a folded state, in accordance with one or more embodiments described herein.
FIG. 13 illustrates an example, non-limiting top view depicting the metal strip of FIG. 9 in the folded state, in accordance with one or more embodiments described herein.

FIGS. 9-13 illustrate example, non-limiting views of a metal strip 905 that overlays a seam intervening between adjacent sections of a thermal shield, in accordance with one or more embodiments described herein. In particular, FIG. 9 illustrates an isometric view 900 of metal strip 905. FIGS. 10-11 illustrate an orthogonal view 1000 and a side view 1100 of metal strip 905 in a flat state, respectively. FIGS. 12-13 illustrate an orthogonal view 1200 and a top view 1300 of metal strip 905 in a folded state, respectively. With reference to FIGS. 9-13, metal strip 905 can comprise a plurality of clearance holes 910 positioned along a longitudinal axis 1010 of metal strip 905. Each clearance hole among the plurality of clearance holes 910 can receive an attachment mechanism (e.g., a bolt or a screw) via a corresponding clearance hole (e.g., clearance holes 1420 and/or 1920 of FIGS. 14 and 19, respectively) of a thermal shield section to facilitate coupling adjacent sections of a thermal shield.

As shown by FIGS. 9-13, the plurality of clearance holes 910 can be positioned on opposing sides of longitudinal axis 1010 to facilitate coupling the adjacent sections of the thermal shield on opposing sides of metal strip 905. By coupling the adjacent sections of the thermal shield on opposing sides of metal strip 905, metal strip 905 can overlay a seam intervening between the adjacent sections. In doing so, metal strip 905 can facilitate minimizing the radiation of energy from a higher temperature thermal stage (e.g., a 4-K stage) of a cryostat to a lower temperature thermal stage (e.g., a Still stage) of the cryostat.

In an embodiment, a thermal shield (e.g., thermal shields 210 and/or 410) can be a metal cylinder with open ends. In this embodiment, the thermal shield can comprise a circumference in which each section can be curved to provide an arc of the circumference. Minimizing gaps between metal strip 905 and such curved sections can involve transitioning metal strip 905 from the flat state shown by FIGS. 10-11 to the folded state shown by FIGS. 12-13. Transitioning metal strip 905 from the flat state to the folded state can be implemented by bending metal strip 905 about longitudinal axis 1010. Bending metal strip 905 about longitudinal axis 1010 can impart a bend radius 1310 on metal strip 905 by reducing a width of metal strip 905 from width 1020 to width 1210. Imparting the bend radius 1310 on metal strip 905 can have a minimal impact on a height of metal strip 905 as a height 1110 of metal strip 905 in the flat state can be substantially equal to a height 1220 of metal strip 905 in the folded state.

Figure 17:
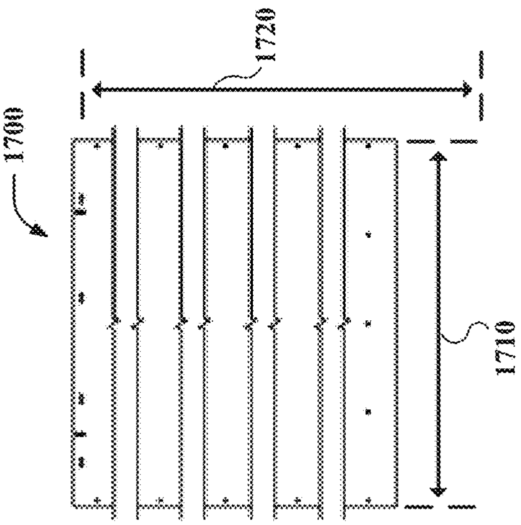
FIG. 17 illustrates an example, non-limiting orthogonal view depicting the thermal shield section of FIG. 14 in a folded state, in accordance with one or more embodiments described herein.
Figure 18:
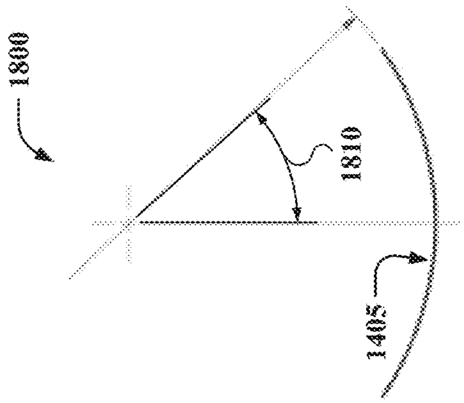
FIG. 18 illustrates an example, non-limiting top view depicting the thermal shield section of FIG. 14 in the folded state, in accordance with one or more embodiments described herein.
Figure 16:
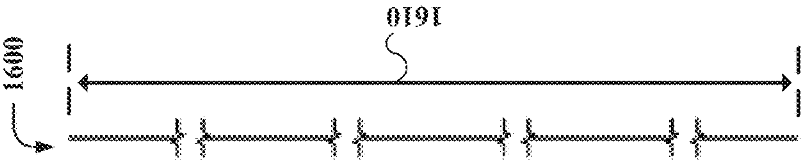
FIG. 16 illustrates an example, non-limiting side view of the thermal shield section of FIG. 14 in the flat state, in accordance with one or more embodiments described herein.
Figure 15:
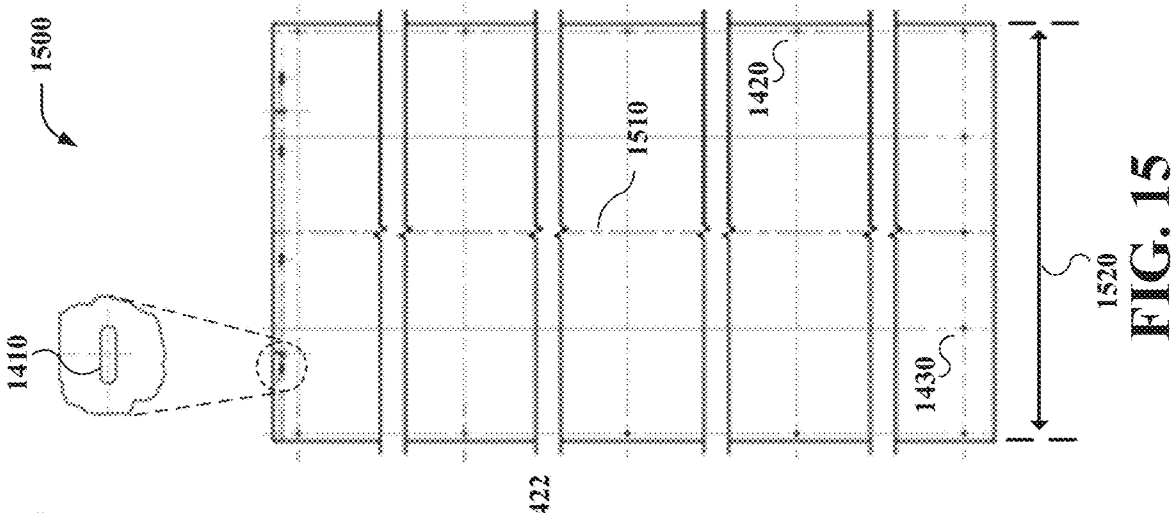
FIG. 15 illustrates an example, non-limiting orthogonal view depicting the thermal shield section of FIG. 14 in a flat state, in accordance with one or more embodiments described herein.
Figure 14:
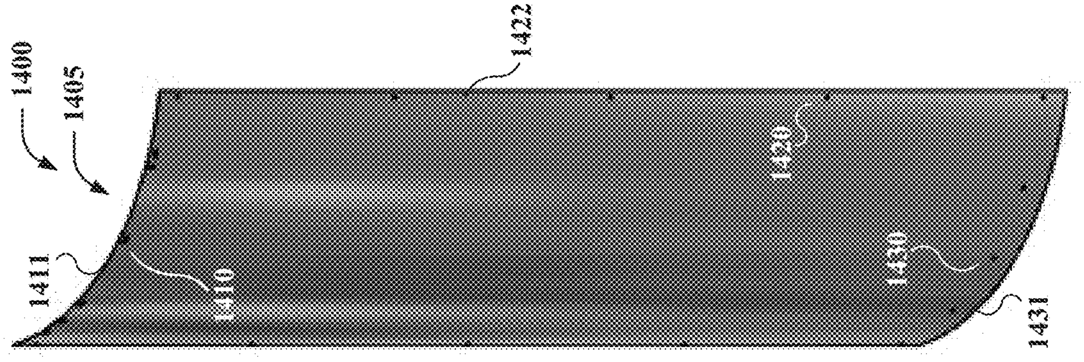
FIG. 14 illustrates an example, non-limiting isometric view depicting a section of a thermal shield, in accordance with one or more embodiments described herein.

FIGS. 14-18 illustrate example, non-limiting views of a thermal shield section (or section) 1405, in accordance with one or more embodiments described herein. In particular, FIG. 14 illustrates an isometric view 1400 of section 1405. FIGS. 15-16 illustrate an orthogonal view 1500 and a side view 1600 of section 1405 in a flat state, respectively. FIGS. 17-18 illustrate an orthogonal view 1700 and a top view 1800 of section 1405 in a folded state, respectively. With reference to FIGS. 14-18, section 1405 can comprise a plurality of clearance holes 1410 positioned along a top edge 1411 of section 1405, a plurality of clearance holes 1420 positioned along each side edge 1421 of section 1405, and a plurality of clearance holes 1430 positioned along a bottom edge 1431 of section 1405.

Each clearance hole among the plurality of clearance holes 1410 can receive an attachment mechanism (e.g., a bolt or a screw) to mechanically anchor section 1405 to a thermal stage (e.g., stages 141 or 143 of FIGS. 1-3). Mechanically anchoring section 1405 to the thermal stage can facilitate thermally coupling section 1405 with the thermal stage. Each clearance hole among the plurality of clearance holes 1420 can receive an attachment mechanism (e.g., a bolt or a screw) via a corresponding clearance hole (e.g., clearance holes 910 of FIG. 9) of a metal strip to facilitate coupling section 1405 to the metal strip. Each clearance hole among the plurality of clearance holes 1430 can receive an attachment mechanism (e.g., a bolt or a screw) to mechanically couple section 1405 to a flexible structure (e.g., flexible structure 630 of FIGS. 6-8) intervening between section 1405 and a base structure (e.g., base structures 160 or 170 of FIG. 1). Mechanically coupling section 1405 to the flexible structure can facilitate thermally coupling section 1405 with the base structure while facilitating vertical movement of section 1405 with respect to the base structure.

In an embodiment, a thermal shield (e.g., thermal shields 210 and/or 410) comprising section 1405 can be a metal cylinder with open ends. In an embodiment, one open end of the metal cylinder can circumscribe an outer wall of the thermal stage when the thermal shield is mechanically anchored to the thermal stage. In an embodiment, the thermal shield can comprise a circumference in which each section can be curved to provide an arc of the circumference. Minimizing gaps between section 1405 and the outer wall of the thermal stage can involve transitioning section 1405 from the flat state shown by FIGS. 15-16 to the folded state shown by FIGS. 17-18. Transitioning section 1405 from the flat state to the folded state can be implemented by bending section 1405 about longitudinal axis 1510. Bending section 1405 about longitudinal axis 1510 can impart a bend radius 1810 on section 1405 by reducing a width of section 1405 from width 1520 to width 1710. Imparting the bend radius 1810 on section 1405 can have a minimal impact on a height of section 1405 as a height 1610 of section 1405 in the flat state can be substantially equal to a height 1720 of section 1405 in the folded state.

Figure 22:
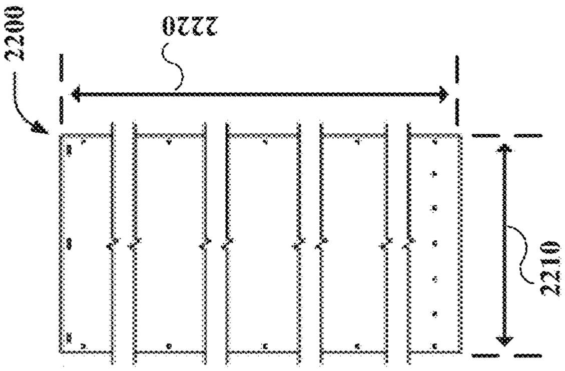
FIG. 22 illustrates an example, non-limiting orthogonal view depicting the thermal shield section of FIG. 19 in a folded state, in accordance with one or more embodiments described herein.
Figure 23:
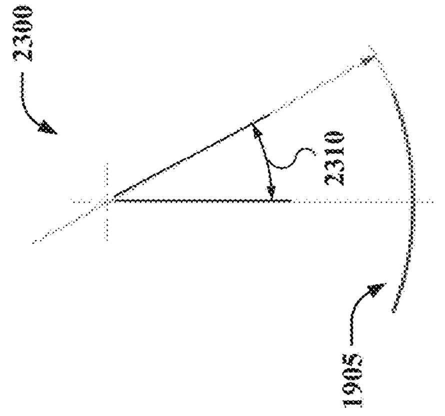
FIG. 23 illustrates an example, non-limiting top view depicting the thermal shield section of FIG. 19 in the folded state, in accordance with one or more embodiments described herein.
Figure 21:
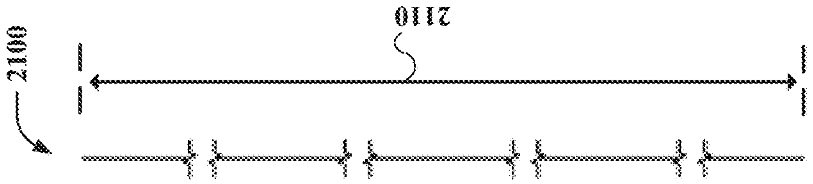
FIG. 21 illustrates an example, non-limiting side view of the thermal shield section of FIG. 19 in the flat state, in accordance with one or more embodiments described herein.
Figure 20:
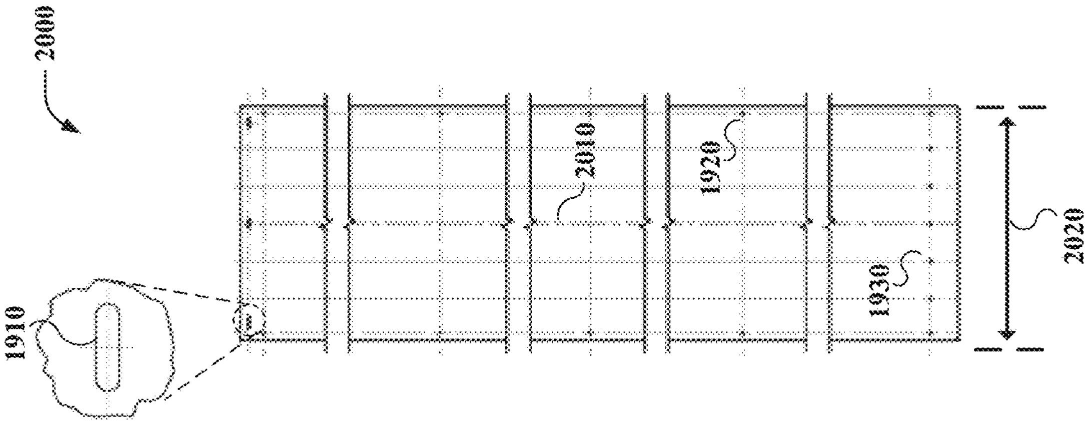
FIG. 20 illustrates an example, non-limiting orthogonal view depicting the thermal shield section of FIG. 19 in a flat state, in accordance with one or more embodiments described herein.
Figure 19:
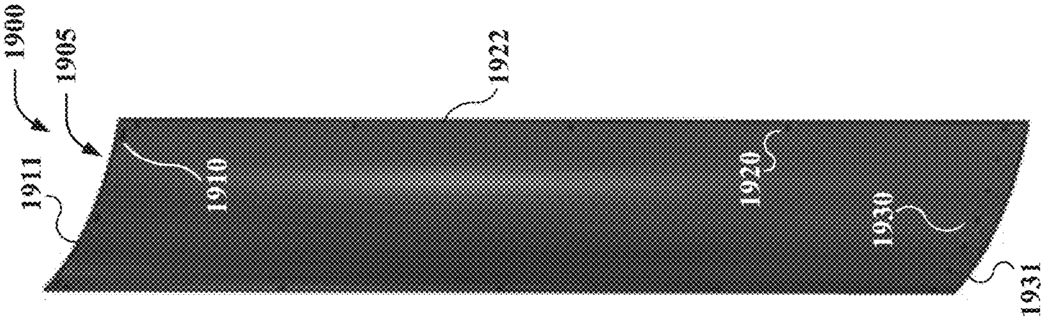
FIG. 19 illustrates an example, non-limiting isometric view depicting a section of a thermal shield, in accordance with one or more embodiments described herein.

FIGS. 19-23 illustrate example, non-limiting views of another thermal shield section (or section) 1905, in accordance with one or more embodiments described herein. In particular, FIG. 19 illustrates an isometric view 1900 of section 1905. FIGS. 20-21 illustrate an orthogonal view 2000 and a side view 2100 of section 1905 in a flat state, respectively. FIGS. 22-23 illustrate an orthogonal view 2200 and a top view 2300 of section 1905 in a folded state, respectively. With reference to FIGS. 19-23, section 1905 can comprise a plurality of clearance holes 1910 positioned along a top edge 1911 of section 1905, a plurality of clearance holes 1920 positioned along each side edge 1921 of section 1905, and a plurality of clearance holes 1930 positioned along a bottom edge 1931 of section 1905.

Each clearance hole among the plurality of clearance holes 1910 can receive an attachment mechanism (e.g., a bolt or a screw) to mechanically anchor section 1905 to a thermal stage (e.g., stages 141 or 143 of FIGS. 1-3). Mechanically anchoring section 1905 to the thermal stage can facilitate thermally coupling section 1905 with the thermal stage. Each clearance hole among the plurality of clearance holes 1920 can receive an attachment mechanism (e.g., a bolt or a screw) via a corresponding clearance hole (e.g., clearance holes 910 of FIG. 9) of a metal strip to facilitate coupling section 1905 to the metal strip. Each clearance hole among the plurality of clearance holes 1930 can receive an attachment mechanism (e.g., a bolt or a screw) to mechanically couple section 1905 to a flexible structure (e.g., flexible structure 630 of FIGS. 6-8) intervening between section 1905 and a base structure (e.g., base structures 160 or 170 of FIG. 1). Mechanically coupling section 1905 to the flexible structure can facilitate thermally coupling section 1905 with the base structure while facilitating vertical movement of section 1905 with respect to the base structure.

In an embodiment, a thermal shield (e.g., thermal shields 210 and/or 410) comprising section 1905 can be a metal cylinder with open ends. In an embodiment, one open end of the metal cylinder can circumscribe an outer wall of the thermal stage when the thermal shield is mechanically anchored to the thermal stage. In an embodiment, the thermal shield can comprise a circumference in which each section can be curved to provide an arc of the circumference. Minimizing gaps between section 1905 and the outer wall of the thermal stage can involve transitioning section 1905 from the flat state shown by FIGS. 20-21 to the folded state shown by FIGS. 22-23. Transitioning section 1905 from the flat state to the folded state can be implemented by bending section 1905 about longitudinal axis 2010. Bending section 1905 about longitudinal axis 2010 can impart a bend radius 2310 on section 1905 by reducing a width of section 1905 from width 2020 to width 2210. Imparting the bend radius 2310 on section 1905 can have a minimal impact on a height of section 1905 as a height 2110 of section 1905 in the flat state can be substantially equal to a height 2220 of section 1905 in the folded state.

Embodiments of the present invention may be a system, a method, and/or an apparatus at any possible technical detail level of integration. What has been described above includes mere examples of systems, methods, and apparatus.

It is, of course, not possible to describe every conceivable combination of components or computer-implemented methods for purposes of describing this disclosure, but one of ordinary skill in the art can recognize that many further combinations and permutations of this disclosure are possible. Furthermore, to the extent that the terms “includes,” “has,” “possesses,” and the like are used in the detailed description, claims, appendices and drawings such terms are intended to be inclusive in a manner similar to the term “comprising” as “comprising” is interpreted when employed as a transitional word in a claim.

In addition, the term “or” is intended to mean an inclusive “or” rather than an exclusive “or.” That is, unless specified otherwise, or clear from context, “X employs A or B” is intended to mean any of the natural inclusive permutations. That is, if X employs A; X employs B; or X employs both A and B, then “X employs A or B” is satisfied under any of the foregoing instances. Moreover, articles “a” and “an” as used in the subject specification and annexed drawings should generally be construed to mean “one or more” unless specified otherwise or clear from context to be directed to a singular form. As used herein, the terms “example” and/or “exemplary” are utilized to mean serving as an example, instance, or illustration. For the avoidance of doubt, the subject matter disclosed herein is not limited by such examples. In addition, any aspect or design described herein as an “example” and/or “exemplary” is not necessarily to be construed as preferred or advantageous over other aspects or designs, nor is it meant to preclude equivalent exemplary structures and techniques known to those of ordinary skill in the art.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

While certain example embodiments have been described, these embodiments have been presented by way of example only, and are not intended to limit the scope the disclosures herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the disclosures herein. The accompanying claims and their equivalents are intended to cover such forms or modifications as would fall within the scope and spirit of certain of the disclosures herein.

What is claimed is:

1. A cryostat, comprising:

a thermal shield partitioned into a plurality of sections extending between a thermal stage and a base structure coupled to a bottom plate of an outer vacuum chamber, the thermal stage coupled to a top plate of the outer vacuum chamber, the thermal shield providing access to a sample mounting surface encompassed within the thermal shield from a region external to the outer vacuum chamber via the top and bottom plates of the outer vacuum chamber, and wherein the base structure and the thermal stage are contained within the thermal shield; and a metal strip extending between the thermal stage and the base structure that covers edges of adjacent sections among the plurality of sections, wherein the metal strip comprises a first plurality of attachment points on a first side of a longitudinal axis of the metal strip coupled to a first section of the plurality of sections and a second plurality of attachment points on a second side of the longitudinal axis of the metal strip coupled to a second section of the plurality of sections.

2. The cryostat of claim 1, wherein the thermal shield is mechanically coupled to the base structure by a flexible structure that intervenes between the thermal shield and the base structure, wherein the metal strip is mounted to an external face of the thermal shield.

3. The cryostat of claim 2, wherein the flexible structure thermally couples the thermal shield to the base structure.

4. The cryostat of claim 2, wherein the flexible structure facilitates vertical movement of the thermal shield with respect to the base structure based on thermal expansion and contraction.

5. The cryostat of claim 1, wherein the thermal stage and the base structure operate at temperatures within a defined level of difference.

6. The cryostat of claim 1, wherein the metal strip bends along a longitudinal axis.

7. The cryostat of claim 6, wherein the metal strip conforms to a shape of the thermal shield.

8. The cryostat of claim 1, wherein the thermal shield is mechanically anchored to the thermal stage via a plurality of attachment mechanisms.

9. The cryostat of claim 1, wherein the thermal stage is a 50-kelvin stage or a 4-kelvin stage.

10. The cryostat of claim 1, wherein the thermal shield is a metal cylinder with open ends.

11. The cryostat of claim 1, wherein the thermal shield comprises aluminum, copper, brass, titanium, gold, platinum, or a combination thereof.

12. The cryostat of claim 1, wherein the thermal shield comprises a minimum thickness of an eighth of an inch.

13. A cryostat, comprising:

a flexible structure intervening between a thermal shield partitioned into a plurality of sections and a base structure coupled to a bottom plate of an outer vacuum chamber, wherein the flexible structure mechanically couples the thermal shield to the base structure, wherein the thermal shield extends between the base structure and a thermal stage coupled to a top plate of the outer vacuum chamber, and wherein the thermal shield provides access to a sample mounting surface encompassed within the thermal shield from a region external to the outer vacuum chamber via the top and bottom plates of the outer vacuum chamber, and wherein the base structure and the thermal stage are contained within the thermal shield; and a metal strip extending between the thermal stage and the base structure that covers edges of adjacent sections among the plurality of sections, wherein the metal strip comprises a first plurality of attachment points on a first side of a longitudinal axis of the metal strip coupled to a first section of the plurality of sections and a second plurality of attachment points on a second side of the longitudinal axis of the metal strip coupled to a second section of the plurality of sections.

14. The cryostat of claim 13, wherein the flexible structure facilitates vertical movement of the thermal shield with respect to the base structure based on thermal expansion and contraction, wherein the metal strip is mounted to an external face of the thermal shield.

15. The cryostat of claim 13, wherein the thermal stage and the base structure operate at temperatures within a defined level of difference.

16. The cryostat of claim 13, wherein the flexible structure thermally couples the thermal shield to the base structure, and wherein a plurality of attachment mechanisms mechanically anchoring the thermal shield to the thermal stage facilitate thermally coupling the thermal shield with the thermal stage.

17. The cryostat of claim 13, wherein the flexible structure comprises aluminum, copper, brass, titanium, gold, platinum, or a combination thereof.

18. The cryostat of claim 13, wherein the flexible structure couples with the base structure on a first side of the thermal shield and couples with the thermal shield on a second side of the thermal shield that opposes the first side.

19. The cryostat of claim 13, wherein the flexible structure comprises a foil or a braided metal wire.

20. The cryostat of claim 13, wherein the flexible structure comprises a slack defined by a maximum vertical displacement of the thermal shield responsive to varying geometries of the thermal stage due to thermal expansion or contraction.

21. A cryostat comprising:

a base structure coupled to a bottom plate of an outer vacuum chamber and a flexible structure intervening between the base structure and a thermal shield partitioned into a plurality of sections, wherein the flexible structure mechanically couples the base structure to the thermal shield, wherein the thermal shield extends between the base structure and a thermal stage coupled to a top plate of the outer vacuum chamber, and wherein the thermal shield provides access to a sample mounting surface encompassed within the thermal shield from a region external to the outer vacuum chamber via the top and bottom plates of the outer vacuum chamber, and wherein the base structure and the thermal stage are contained within the thermal shield; and a metal strip extending between the thermal stage and the base structure that covers edges of adjacent sections among the plurality of sections, wherein the metal strip comprises a first plurality of attachment points on a first side of a longitudinal axis of the metal strip coupled to a first section of the plurality of sections and a second plurality of attachment points on a second side of the longitudinal axis of the metal strip coupled to a second section of the plurality of sections.

22. The cryostat of claim 21, wherein the base structure comprises a clearance hole for receiving an attachment mechanism that couples the base structure to the flexible structure.

23. The cryostat of claim 21, wherein the flexible structure facilitates vertical movement of the thermal shield with respect to the base structure based on thermal expansion and contraction, wherein the metal strip is mounted to an external face of the thermal shield.

24. The cryostat of claim 21, wherein the flexible structure thermally couples the base structure with the thermal stage.

* * * * *